United States Patent
Carlson

(10) Patent No.: US 6,769,310 B2
(45) Date of Patent: Aug. 3, 2004

(54) FLOW-INDICATING DEVICE AND ASSOCIATED MECHANISM AND METHOD

(75) Inventor: Stephen John Carlson, Shorewood, MN (US)

(73) Assignee: The BOC Group, Inc., New Providence, NJ (US)

( * ) Notice: Subject to any disclaimer, the term of this patent is extended or adjusted under 35 U.S.C. 154(b) by 207 days.

(21) Appl. No.: 10/166,469

(22) Filed: Jun. 10, 2002

(65) Prior Publication Data

US 2003/0226406 A1 Dec. 11, 2003

(51) Int. Cl.[7] .............................................. G01F 1/22
(52) U.S. Cl. .................................................. 73/861.57
(58) Field of Search ........................ 73/861.52, 861.57, 73/861.63, 861.58, 861.55, 861.53

(56) References Cited

U.S. PATENT DOCUMENTS

| | | | | |
|---|---|---|---|---|
| 5,186,058 A | * | 2/1993 | Lew | 73/861.56 |
| 5,820,715 A | * | 10/1998 | Singleterry et al. | 156/73.1 |
| 6,338,279 B1 | * | 1/2002 | Tsataros | 73/861.56 |

* cited by examiner

Primary Examiner—Edward Lefkowitz
Assistant Examiner—Jewel Thompson
(74) Attorney, Agent, or Firm—Ira Lee Zebrak

(57) ABSTRACT

A flow-indicating device is provided, comprising a tubular body adapted to direct a flow therethrough. The body has opposed ends, with one end being a downstream end, and has a flow element disposed therein. A shaping block is operably engaged with the body so as to form a constricted portion between the ends, the constricted portion of the body defining a constricted orifice having a downstream side. The constricted orifice is configured to prevent the flow element from passing therethrough. The flow element is disposed on the downstream side of the constricted portion and is configured to engage the constricted orifice when the flow is below a flow rate and to move toward the downstream end of the body as the flow increases over the flow rate to thereby indicate the flow through the body. A sensor may be operably engaged with the shaping block between the constricted portion and the downstream end of the body, wherein the sensor is configured to produce a signal in response to the flow element moving toward the downstream end of the body as the flow increases, or the flow element may be viewed through a transparent shaping block or a slot defined by the shaping block. An associated mechanism and method are also provided.

27 Claims, 6 Drawing Sheets

FLOW-INDICATING DEVICE AND ASSOCIATED MECHANISM AND METHOD

BACKGROUND OF THE INVENTION

1. Field of the Invention

The present invention relates to flow indicating devices and, more particularly, to a simplified flow-indicating device and associated mechanism and method.

2. Description of Related Art

Flow-indicating devices for high-purity fluids may often be expensive and complicated devices due to the construction and configuration factors which must be taken into account so as to minimize contamination of the fluid. In some instances, in order to automatically obtain a desired flow of such a high-purity fluid, a suitable rotometer (otherwise referred to herein as a flow meter) is used with a separate optical detector or sensor for detecting when the flow has reached a certain level. That is, the flow meter typically includes a flow element which is moved along a graduated scale as the flow increases. The optical sensor is disposed externally to the flow meter and senses when the flow has reached a certain level by detecting the position of the flow element. However, some rotometers may require extensive machining and fitting of components to provide a calibrated flow. Accordingly, due to the nature of such a rotometer, entire units must be used for each application. For example, a rotometer used one application for one fluid may not be readily and interchangeably used in a second application for a second fluid due to cross-contamination concerns.

In other situations, the rotometers may include components which, as a result of the design of the flow meter, contact the fluid or otherwise comprise a pathway between the external environment and the fluid flowing within the flow meter, thereby introducing the risk of fluid contamination. Further, since the optical sensor is a separate component which must be suitably secured in correspondence with the flow meter in order to sense a particular and calibrated flow. Accordingly, any disruption of the relationship between the optical sensor and the flow meter, such as to replace the optical sensor or to move the optical sensor to a different position to detect a different desired flow rate, may require another complete calibration when the device is returned to service.

Thus, there exists a need for a simple, low-cost flow-indicating device, such as a flow meter or flow switch. Such a device should desirably be readily adaptable to various applications without having to replace the entire unit. Further, such a device should desirably remain functionally calibrated for successive applications or replacement of components. In addition, the device should desirably be configured so as to minimize the risk of contamination of the fluid.

BRIEF SUMMARY OF THE INVENTION

The above and other needs are met by the present invention which, in one embodiment, provides a mechanism for forming a flow-indicating device. Such a mechanism comprises a shaping block adapted to operably engaged a tubular body having opposed ends, wherein one of the ends is a downstream end, so as to form a constricted portion therebetween. The body is adapted to direct a flow therethrough and is adapted to have a flow element disposed therein. The constricted portion of the body formed by the shaping block thereby defines a constricted orifice having a downstream side, wherein the constricted orifice is configured to prevent the flow element from passing therethrough and has the flow element disposed on the downstream side thereof. The shaping block is further configured with respect to the body such that the flow element engages the constricted orifice when the flow is below a flow rate and moves toward the downstream end of the body as the flow increases over the flow rate to thereby indicate the flow through the body.

Another advantageous aspect of the present invention comprises a flow-indicating device having a tubular body adapted to direct a flow therethrough. The body has opposed ends, with one end being a downstream end, and has a flow element disposed therein. A shaping block is operably engaged with the body so as to form a constricted portion between the ends, wherein the constricted portion of the body defines a constricted orifice having a downstream side. The constricted orifice is configured to prevent the flow element from passing therethrough and has the flow element disposed on the downstream side thereof. The shaping block is further configured with respect to the body such that the flow element engages the constricted orifice when the flow is below a flow rate and moves toward the downstream end of the body as the flow increases over the flow rate to thereby indicate the flow through the body. A processing device may be operably engaged with the sensor in order to receive the signal therefrom and to perform a task in response thereto.

Yet another advantageous aspect of the present invention comprises a method of forming a flow-indicating device. First, a shaping block is operably engaged with a tubular body, wherein the body is adapted to direct a flow therethrough and has opposed ends, with one end being a downstream end. A constricted portion is thereby formed between the ends and defines a constricted orifice having a downstream side. A flow element is disposed within the body on the downstream side of the constricted orifice, wherein the constricted orifice is configured to prevent the flow element from passing therethrough. The shaping block is configured with respect to the body such that the flow element engages the constricted orifice when the flow is below a flow rate and moves toward the downstream end of the body as the flow increases over the flow rate to thereby indicate the flow through the body.

Thus, embodiments of the present invention provide a flow-indicating device, such as a flow meter or flow switch, which may be simply and cost effectively produced. Since the device is comprised of a shaping block externally engaging a tubular body, the body may be readily replaced or interchanged with another similar tubular body without having to replace the entire unit. Further, since the shaping block includes the sensor(s) for detecting the flow through the body, the shaping block remains functionally calibrated for successive replacement bodies. In addition, since the shaping block and the sensor(s) only externally engage the body and do not come in contact with the flow, an advantage in maintaining the purity of the flow may be realized. Thus, embodiments of a flow-indicating device according to embodiments of the present invention provide significant advantages as further detailed herein.

BRIEF DESCRIPTION OF THE SEVERAL VIEWS OF THE DRAWING(S)

Having thus described the invention in general terms, reference will now be made to the accompanying drawings, wherein:

DETAILED DESCRIPTION OF THE INVENTION

Figure 1:
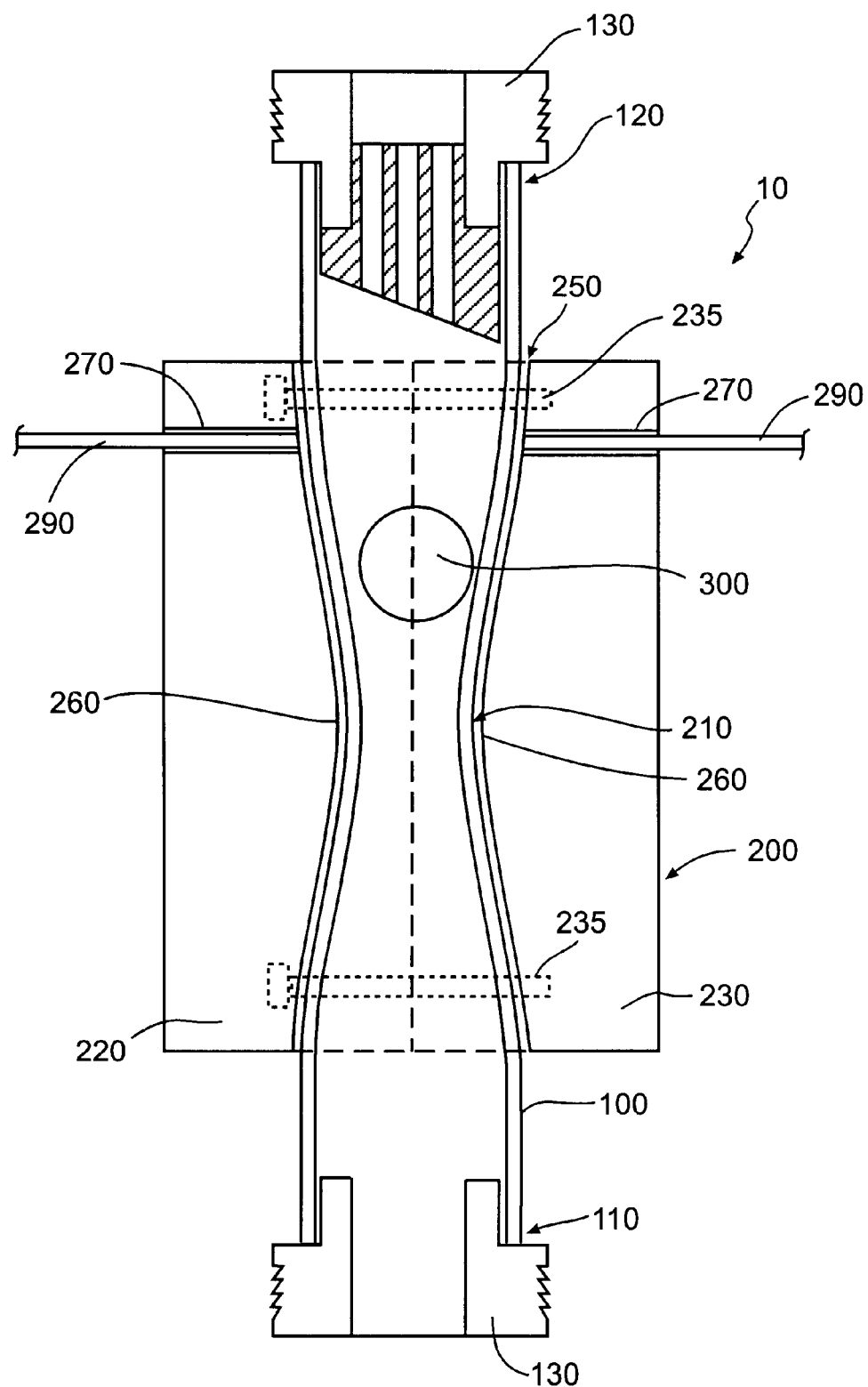
FIG. 1 is a cross-sectional view of a flow-indicating device according to one embodiment of the present invention.

The present invention now will be described more fully hereinafter with reference to the accompanying drawings, in which some, but not all embodiments of the invention are shown. Indeed, this invention may be embodied in many different forms and should not be construed as limited to the embodiments set forth herein. Like numbers refer to like elements throughout.

FIGS. 1 and 2A–2C schematically illustrates a flow-indicating device according to one embodiment of the present invention, the device being indicated generally by the numeral 10. The device 10 comprises a tubular body 100, a shaping block 200, and a flow element 300, wherein the device 10 is configured to direct a flow of, for example, a gas or a liquid therethrough. The body 100 is generally configured as a circular tube, though one skilled in the art will appreciate that the present invention may be implemented with many different tube configurations. The body 100 may be further comprised of, for example, flexible tubing made of a polytetrafluoroethylene material, such as Teflon®, though many other materials may also be used where desired or necessary for compatibility with the gas or liquid flowing through the body 100 or for cost or other considerations. In one embodiment, for example, the body 100 may be transparent. The body 100 further includes an upstream end 110 and a downstream end 120 through which the flow enters and exits the body 100, respectively. Each of the ends 110, 120 have a plug 130 engaged therewith, wherein the plugs 130 are configured to allow the flow to pass through the body 100.

Figure 3:
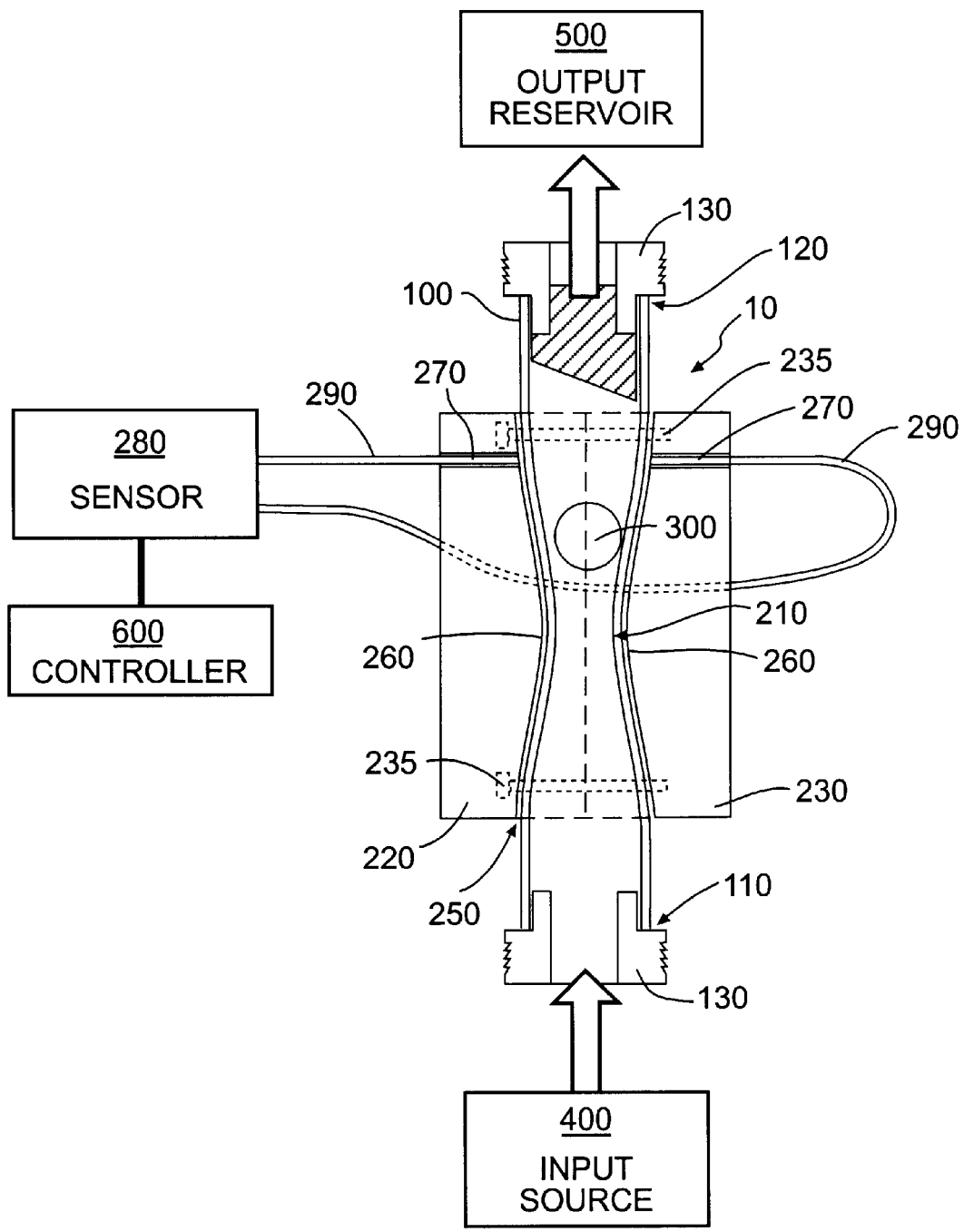
FIG. 3 is a schematic illustration of a system incorporating a flow-indicating device according to one embodiment of the present invention.

The flow element 300 may comprise, for example, a ball, wherein the ball 300 may be comprised of any suitable material such as, for instance, a polytetrafluoroethylene material such as Teflon®. The flow element 300 is disposed within the body 100 and is moved along the body 100 by the flow directed therethrough. Accordingly, in embodiments of the present invention, the plug 130 engaged with the downstream end 120 of the body 100 is additionally configured to prevent the flow element 300 from exiting the body 100 when the flow is directed therethrough. Outward of the body 100, the plugs 130 may have, for example, threads and may be configured to sealingly engage flare fittings for connecting an inlet source 400 and an outlet reservoir 500 to the upstream end 110 and the downstream end 120 of the body 100, respectively, as shown in FIG. 3. However, one skilled in the art will appreciate that the plugs 130 may be configured in many different manners depending, at least in part, on the requirements of the system in which the device is implemented. For example, the plugs 130 may be configured with or to accept tapered fittings, a variety of quick-connect fittings, or any number of commonly available or custom-made fittings. In other instances, the plug 130 engaged with the downstream end 120 may be configured such that contact of the flow element 300 therewith limits or stops the flow through the body 100, thereby providing a high flow limiter or shut-off mechanism.

According to one advantageous aspect of the present invention, the shaping block 200 is configured to operably engage the body 100 so as to compress a portion of the body 100 to form a constricted portion 210. For example, the shaping block 200 may comprise a first block portion 220 and a second block portion 230, as shown in FIGS. 1 and 2A–2C. In some embodiments, each of the first and second block portions 220, 230 defines a groove 240 such that when the first and second block portions 220, 230 are secured about the body 100, the grooves 240 define a duct 250 generally corresponding to the outer dimension of the body 100. Accordingly, when the shaping block 200 is operably engaged with the body 100, the body 100 is coaxial with the duct 250. The grooves 240 further include corresponding protrusions 260 extending into the duct 250 when the first and second block portions 220, 230 are engaged. As such, the protrusions 260 compress the body 100 to form the constricted portion 210, wherein, if viewed axially, the constricted portion 210 would define, for example, an oval orifice. The first and second block portions 220, 230 may be secured together in many different manners such as, for example, by fasteners 235 or, for instance, through a snap locking mechanism, an adhesive, or in any other suitable manner.

Figure 4:
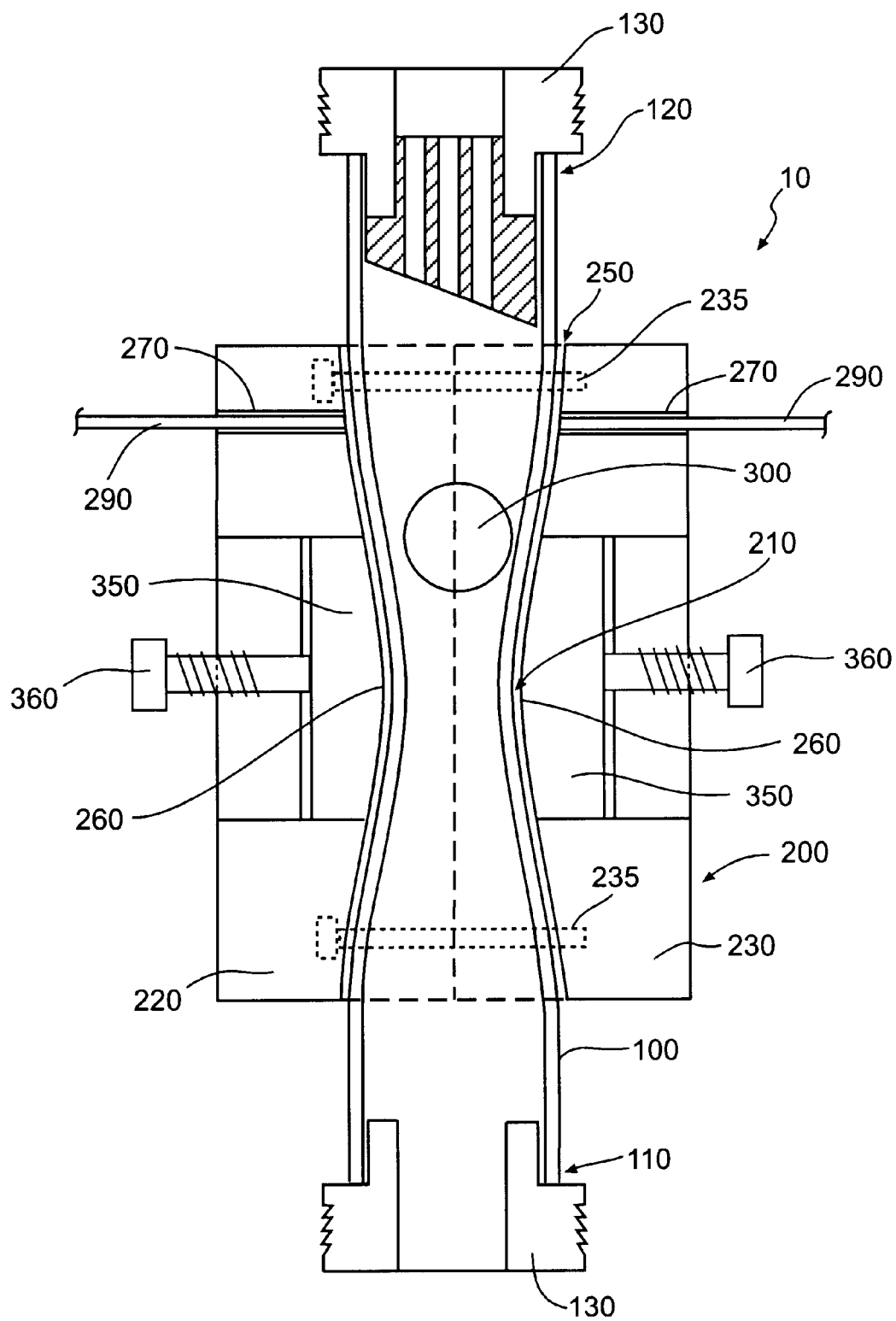
FIG. 4 is a cross-sectional view of a flow-indicating device according to an alternate embodiment of the present invention.

In some instances, the dimensions of the orifice defined by the constricted portion 210 may be adjusted by adjusting the securing force imparted by the fasteners 235 or other securing mechanism securing the first and second block portions 220, 230. However, the orifice dimensions, and thus the characteristics of the flow through the body 100 may be adjusted by many other mechanisms as will be appreciated by one skilled in the art. For example, as shown in FIG. 4, the shaping block 200 may further include an adjusting plate 350 disposed at or about one or both of the protrusions 260 and adjustable into or out of the grooves 240. Each adjusting plate may further be adjusted with respect to the duct 250 by, for example, an adjusting screw 360 operably engaged therewith and adjustable from outside the shaping block 200, so as to change the dimensions of the duct 250 about the constricted portion 210 of the body 100. Accordingly, the resulting changes in the orifice dimensions affect the characteristics of the flow through the body 100.

One skilled in the art will appreciate, however, that the shaping body 200 may be configured in many different manners to form the constricted portion 210 when engaged with the body 100. For example, the shaping block 200 may be configured to have two axially engaging portions, each defining an orifice corresponding to the outer dimension of the body 100. The interface of the two axially engaging portions may be configured as a compression fitting such that engagement thereof compresses the body 100 to form the constricted portion 210 which, in this instance, would define a circular orifice when viewed axially. Further, according to another advantageous aspect of the present invention, the shaping block 200 is configured to form the constricted portion 210 of the body 100 between the upstream and downstream ends 110, 120 such that the flow element 300 is disposed between the constricted portion 210 and the downstream end 120. The constricted portion 210 is further configured such that the flow element 300 is not capable of passing therethrough. As a result, advantageous embodiments of the device 10 are configured such that, when no flow or a flow below a certain flow rate is directed through the body 100, the flow element 300 is disposed at the constricted portion 210 and, as the flow increases over that certain flow rate, the flow element 300 is directed toward the downstream end 120 of the body 100.

One skilled in the art will also appreciate that the shaping block 200 may be comprised of any suitable rigid material such as, for example, metal, plastic, wood, or the like. In some embodiments, the shaping block 200 may be comprised of a transparent polymer or plastic such as, for instance, polypropylene or polycarbonate, such that the position of the flow element 300 along the body 100, and thus the flow through the body 100, can be observed and/or measured from the outside of the shaping block 200. In instances where the shaping block 200 is not transparent, the shaping block 200 may further define a slot 380, as shown in FIG. 2C, extending between the constricted portion 210 and the downstream end 120 to permit viewing of the position of the flow element 300 along the body 100.

Another advantageous aspect of the present invention utilizes the movement of the flow element 300 toward the downstream end 120 of the body 100, as the flow increases, to actuate other processes in the system associated with the device 10. In order to accomplish such actuation, the shaping block 200 may further comprise one or more channels 270 extending into either or both of the first and second block portions 220, 230 perpendicularly to the axis of the body 100. For example, FIGS. 1–3 illustrates two such channels 270 in correspondence across the body 100 between the constricted portion 210 and the downstream end 120, wherein the channels 270 may be configured to receive, for example, a sensor 280. The sensor 280 may be directly engaged with each channel 270 or connected thereto by, for instance, fiber optic elements 290, as shown. The sensor 280 may comprise, for example, an optical sensor or a capacitive sensor, wherein one skilled in the art will appreciate that the shaping block 200 and the body 100 may be appropriately configured to functionally accept the chosen sensor type and the sensitivity of the sensor 280 may vary according to requirements of the particular application.

Figure 2A:
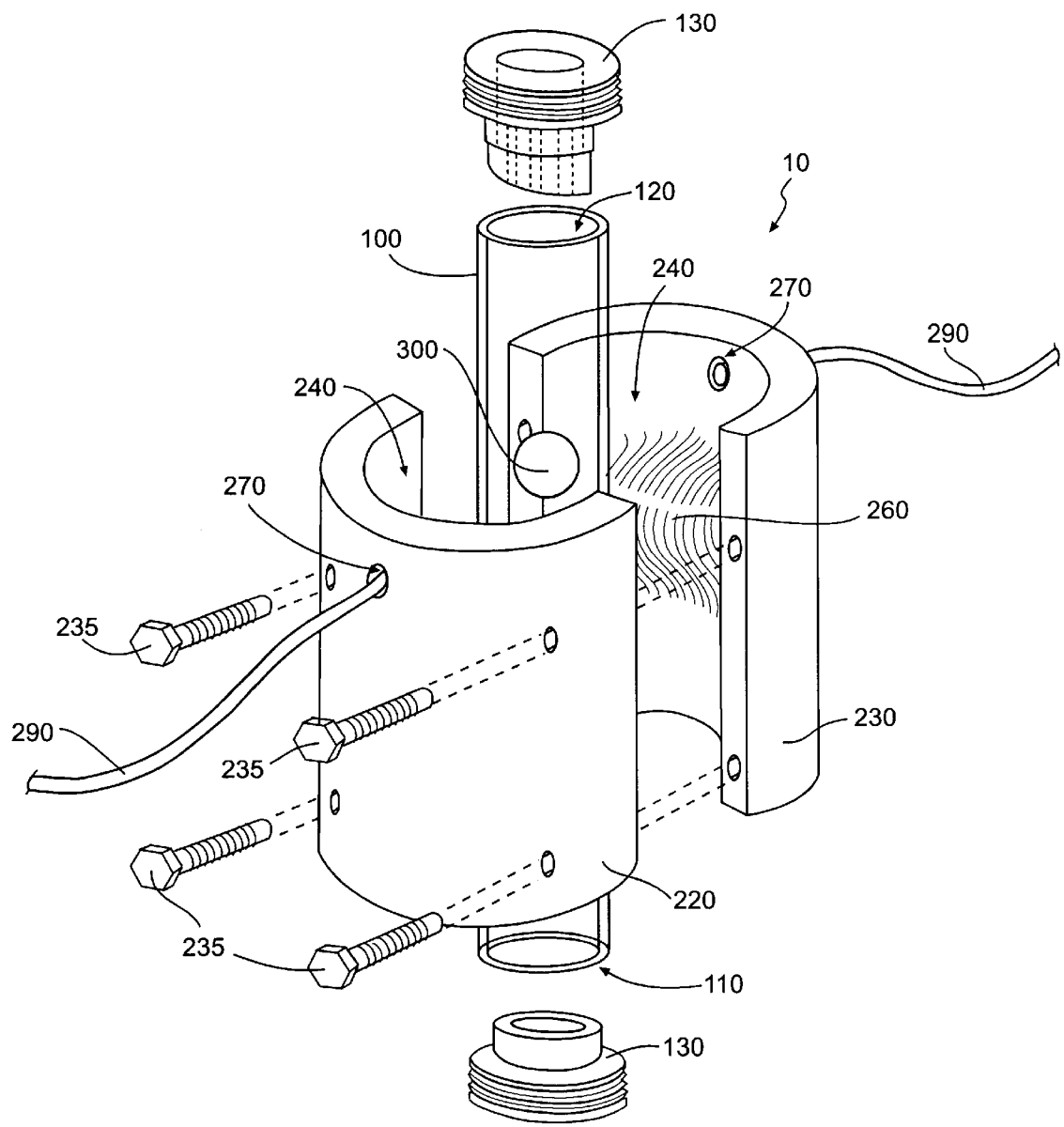
FIGS. 2A–2C are exploded perspective views of alternate embodiments of a flow-indicating device according to the present invention.
Figure 2B:
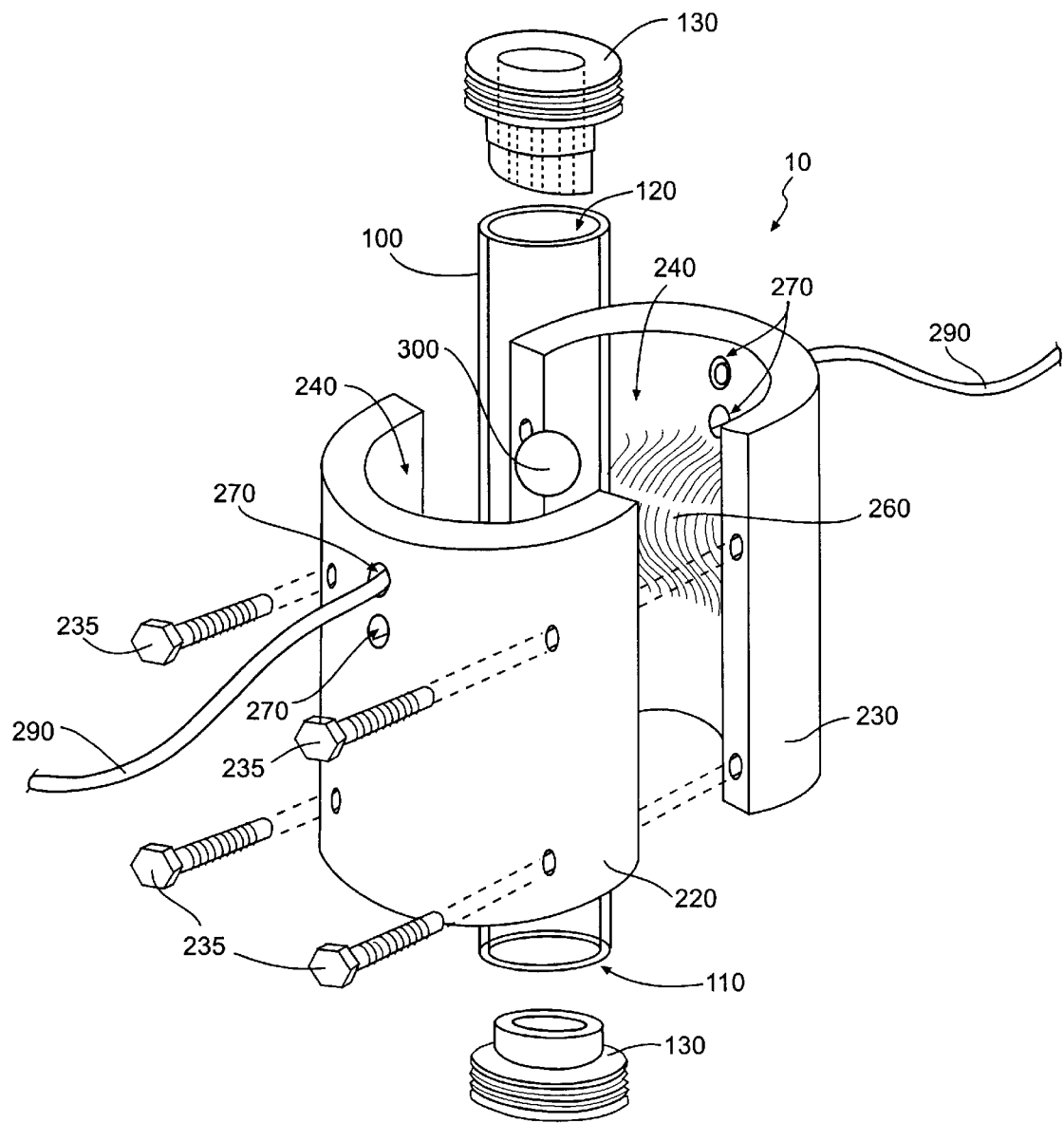
Figure 2C:
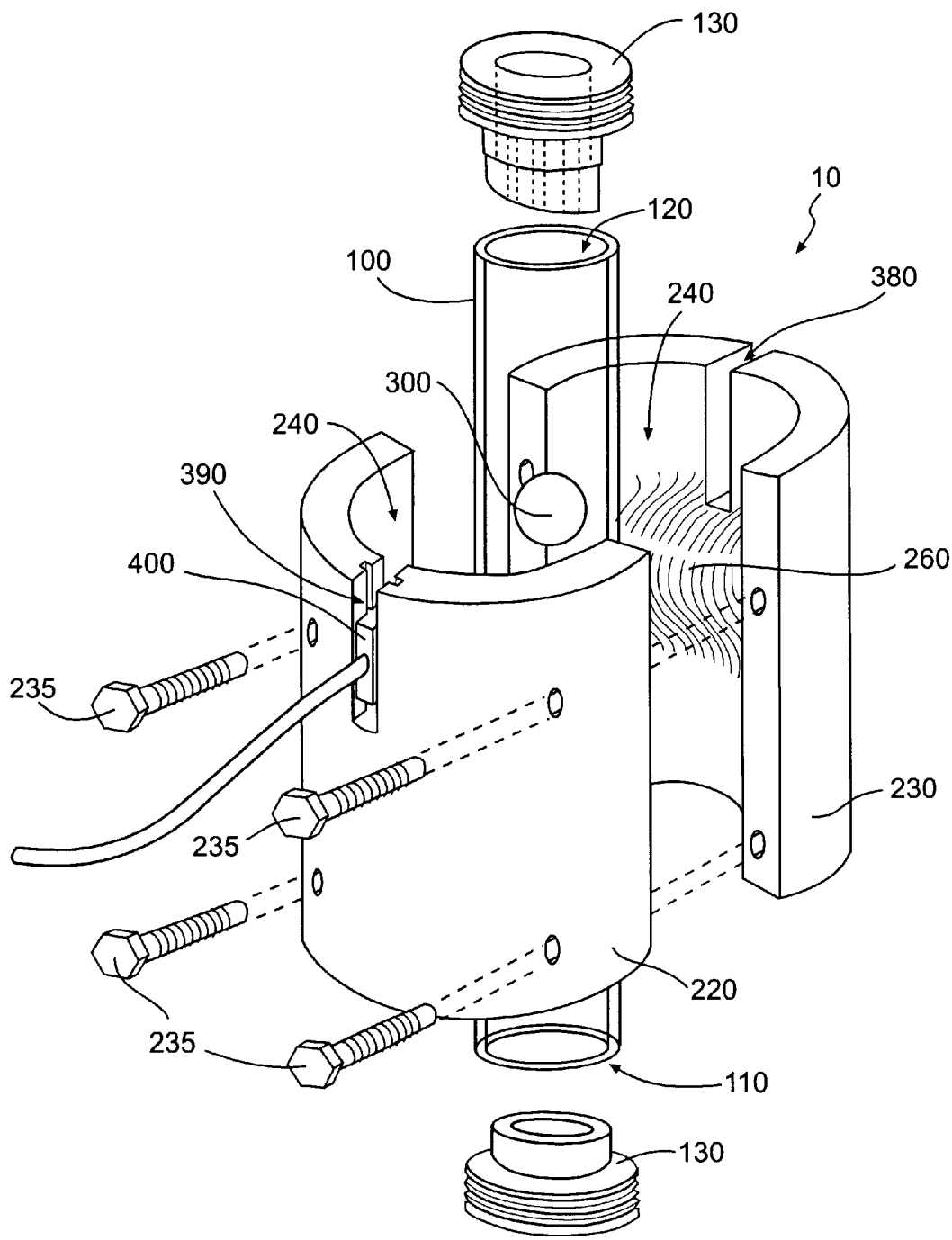

FIGS. 1–3 illustrate one embodiment of the present invention, wherein the sensor 280 particularly comprises an optical sensor configured to direct a continuous optical signal through one fiber optic element 290, across the body 100, and back through the opposite corresponding fiber optic element 290 to the optical sensor 280. The optical sensor 280 may comprise one of many commercially available devices such as, for example, a Model 400-001-080 Odyssey FiberOptic Switch manufactured by FutureStar Corp. of Bloomington, Minn. Increase of the flow thereby directs the flow element 300 toward the optical signal traversing the body 100 such that an interruption of the optical signal by the flow element 300 is recognized by the sensor 280. As such, the channels 270 and/or the sensor 280 may be configured and disposed along the shaping block 200 such that the flow element 300 interrupts the optical signal when a desired flow is attained. When an interruption of the optical signal is recognized by the sensor 280, the sensor 280 sends a corresponding signal to a controller 600 in communication with the sensor 280. The controller 600, in turn, actuates or performs a task in response to the signal from the sensor 280. For example, in response to the signal, the controller 600 may regulate or otherwise control the input source 400 such that the flow producing the signal is maintained. In other instances, the signal may indicate a high flow or overflow situation which would, in turn, cause the controller 600 to shut off the input source 400. Further, in some instances, the shaping block 200 may include a plurality or series of channels 270 placed at different intervals along the shaping block 200, as shown in FIG. 2B, such that the flow at which the sensor 280 is activated may be adjustably selected by selecting the channel 270 in which the sensor 280 is placed. However, one skilled in the art will appreciate that many other mechanisms for adjustably selecting the flow rate at which the sensor 280 is activated, or for viewing or otherwise determining the flow through the body 100, may be provided where necessary or desirable. For example, the shaping block 200 may define a slot 390, as shown in FIG. 2C, configured to accept an optical sensor 400 for measuring the flow rate through the body 100, wherein the sensor 400 may be slidably adjusted with respect to the slot 390. Further, one skilled in the art will appreciate that the present disclosure describes and otherwise supports methods associated with embodiments of the present invention such as, for instance, a method of forming a flow-indicating device and a method of indicating a flow, as described and claimed herein.

Thus, embodiments of the present invention provide a flow-indicating device 10, such as a flow meter or flow switch, which may be simply and cost effectively produced. Since the device 10 is comprised of a shaping block 200 externally engaging a tubular body 100, the body 100 may be readily replaced or interchanged with another similar tubular body without having to replace the entire unit. Further, since the shaping block 200 includes the sensor(s) 280 for detecting the flow through the body 100, the shaping block 200 remains functionally calibrated for successive replacement bodies 100 or is otherwise readily adjustable or calibrated. In addition, since the shaping block 200 and the sensor(s) 280 only externally engage the body 100 and do not come in contact with the flow, an advantage in maintaining the purity of the flow may be realized.

Many modifications and other embodiments of the invention set forth herein will be apparent to one skilled in the art to which this invention pertains having the benefit of the teachings presented in the foregoing descriptions and the associated drawings. For example, the shaping block 200 may be particularly configured to be removable from the body 100 and applied to another body 100 of the same dimensions, wherein the sensor-flow relationship would be maintained. Accordingly, such a feature would make use of an essentially disposable body 100 and a reusable functional meter or switch portion provided by the shaping block 200 and the associated sensor(s) 280, thereby providing a significant cost savings over requiring an entire device for each new application or upon expiration of the service life of an existing unit. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A mechanism for forming a flow-indicating device, comprising:

a shaping block adapted to operably engage a tubular body having opposed ends, one of the ends being a downstream end, so as to form a constricted portion therebetween, the body being adapted to direct a flow therethrough and adapted to have a flow element disposed therein, the constricted portion of the body formed by the shaping block thereby defining a constricted orifice having a downstream side, the constricted orifice being configured to prevent the flow element from passing therethrough and having the flow element disposed on the downstream side thereof, the shaping block being further configured with respect to the body such that the flow element engages the constricted orifice when the flow is below a flow rate and moves toward the downstream end of the body as the flow increases over the flow rate to thereby indicate the flow through the body.

2. A mechanism according to claim 1 further comprising a sensor operably engaged with the shaping block between the constricted portion and the downstream end of the body, the sensor being configured to produce a signal in response to the flow element moving toward the downstream end of the body as the flow increases.

3. A mechanism according to claim 1 wherein the shaping block further defines a slot between the constricted portion and the downstream end of the body, the slot being configured to permit viewing of the flow element moving along the body from the constricted orifice toward the downstream end as the flow increases.

4. A mechanism according to claim 1 wherein the shaping block is configured to be secured about the body so as to form the constricted orifice having a cross-sectional shape selected from the group consisting of a circle and an oval.

5. A mechanism according to claim 1 wherein the shaping block is comprised of polypropylene.

6. A flow-indicating device, comprising:
   a tubular body adapted to direct a flow therethrough, the body having opposed ends with one end being a downstream end;
   a flow element disposed within the body; and
   a shaping block operably engaged with the body so as to form a constricted portion between the ends, the constricted portion of the body defining a constricted orifice having a downstream side, the constricted orifice being configured to prevent the flow element from passing therethrough and having the flow element disposed on the downstream side thereof, the shaping block being further configured with respect to the body such that the flow element engages the constricted orifice when the flow is below a flow rate and moves toward the downstream end of the body as the flow increases over the flow rate to thereby indicate the flow through the body.

7. A device according to claim 6 further comprising a sensor operably engaged with the shaping block between the constricted portion and the downstream end of the body, the sensor being configured to produce a signal in response to the flow element moving toward the downstream end of the body as the flow increases.

8. A device according to claim 6 wherein the shaping block further defines a slot between the constricted portion and the downstream end of the body, the slot being configured to permit viewing of the flow element moving along the body from the constricted orifice toward the downstream end as the flow increases.

9. A device according to claim 6 wherein the tubular body is comprised of polytetrafluoroethylene.

10. A device according to claim 6 wherein the shaping block is configured to be secured about the body so as to form the constricted orifice having a cross-sectional shape selected from the group consisting of a circle and an oval.

11. A device according to claim 6 wherein the shaping block is comprised of polypropylene.

12. A device according to claim 7 wherein the sensor is selected from the group consisting of an optical sensor and a capacitive sensor.

13. A device according to claim 6 further comprising a plug operably engaged with the downstream end of the body, the plug being configured to retain the flow element within the body while allowing the flow to pass therethrough.

14. A device according to claim 13 wherein at least one of the flow element and the plug is configured to limit the flow through the downstream end of the body.

15. A device according to claim 6 wherein the flow element comprises a ball.

16. A device according to claim 6 wherein the flow element is comprised of polytetrafluoroethylene.

17. A device according to claim 7 wherein the shaping block is configured to selectively receive the sensor therealong on the downstream side of the constricted orifice so as to allow adjustment of the flow at which the sensor responds to the flow element.

18. A device according to claim 7 wherein the shaping block further defines a sensor-receiving system therealong on the downstream side of the constricted orifice for adjustably receiving the sensor, the sensor-receiving system being selected from the group consisting of a series of orifices and a slot and being configured to allow the sensor to be selectively placed along the shaping block to adjust the flow at which the sensor responds to the flow element.

19. A device according to claim 7 further comprising a processing device operably engaged with the sensor for receiving the signal therefrom and performing a task in response thereto.

20. A device according to claim 6 further comprising a flow input apparatus connected to upstream end of the body and a flow output apparatus connected to the downstream end of the body.

21. A method of forming a flow-indicating device, comprising:
   operably engaging a shaping block with a tubular body, the body being adapted to direct a flow therethrough and having opposed ends with one end being a downstream end, so as to form a constricted portion between the ends, the constricted portion of the body defining a constricted orifice having a downstream side; and
   disposing a flow element within the body on the downstream side of the constricted orifice, the constricted orifice being configured to prevent the flow element from passing therethrough, the shaping block being configured with respect to the body such that the flow element engages the constricted orifice when the flow is below a flow rate and moves toward the downstream end of the body as the flow increases over the flow rate to thereby indicate the flow through the body.

22. A method according to claim 21 further comprising operably engaging a sensor with the shaping block between the constricted portion and the downstream end of the body, the sensor being configured to produce a signal in response to the flow element moving toward the downstream end of the body as the flow increases.

23. A method according to claim 21 further comprising forming a slot in the shaping block between the constricted portion and the downstream end of the body, the slot being configured to permit viewing of the flow element moving along the body from the constricted orifice toward the downstream end as the flow increases.

24. A method according to claim 21 further comprising operably engaging a plug with the downstream end of the body, the plug being configured to retain the flow element within the body while allowing the flow to pass therethrough.

25. A method according to claim 21 wherein operably engaging the shaping block with the tubular body further comprises securing the shaping block about the body so as to form the constricted orifice, the constricted orifice having a cross-sectional shape selected from the group consisting of a circle and an oval.

26. A method according to claim 21 wherein operably engaging the sensor with the shaping block further comprises operably engaging the sensor, selected from the group consisting of an optical sensor and a capacitive sensor, with the shaping block.

27. A method according to claim 21 wherein operably engaging the sensor with the shaping block further comprises selectively operably engaging the sensor with the shaping block along the shaping block on the downstream side of the constricted orifice so as to select the flow at which the sensor responds to the flow element.

* * * * *